March 15, 1966  J. E. McCARTHY  3,240,860
SIMPLIFIED ROLL STABILIZATION FOR DIRECTIONAL GYRO
Filed Jan. 3, 1963  2 Sheets-Sheet 1

JAMES E. McCARTHY
INVENTOR.

BY S. A. Giarratana
Francis L. Masselle
ATTORNEYS

March 15, 1966  J. E. McCARTHY  3,240,860
SIMPLIFIED ROLL STABILIZATION FOR DIRECTIONAL GYRO
Filed Jan. 3, 1963  2 Sheets-Sheet 2

JAMES E. McCARTHY
INVENTOR.

BY S. A. Giarratana
Francis L. Masselle
ATTORNEYS

United States Patent Office 3,240,860
Patented Mar. 15, 1966

3,240,860
SIMPLIFIED ROLL STABILIZATION FOR DIRECTIONAL GYRO
James E. McCarthy, Staten Island, N.Y., assignor to General Precision Inc., Little Falls, N.J., a corporation of Delaware
Filed Jan. 3, 1963, Ser. No. 249,147
6 Claims. (Cl. 74—5.6)

This invention relates to directional gyros and more particularly to a simplified system for providing roll stabilization for a directional gyro.

In a conventional directional gyro, the inertial wheel of the gyro is mounted with its spin axis in a horizontal plane. Gimbals mount the inertial wheel in the frame of the aircraft carrying the directional gyro to permit the spin axis to remain in fixed orientation with respect to inertial space as the aircraft maneuvers. The azimuth angle of the aircraft is the angle between the spin axis of the directional gyro and a horizontal projection of the longitudinal axis of the aircraft. If the aircraft is at zero pitch, the longitudinal axis of the aircraft will be horizontal and the azimuth angle will be the angle between the spin axis and the longitudinal axis of the aircraft. In a conventional directional gyro, a control transformer is mounted on a normally vertical axle of the gimbals supporting the inertial wheel of the directional gyro. The control transformer produces an output signal directly proportional to the amount of rotation of the aircraft with respect to this normally vertical axle, and therefore directly representing the angular position of the longitudinal axis of the aircraft about the axis of this axle. The axis of this axle is referred to as the azimuth axis. The angular rotation of the aircraft is measured in a plane perpendicular to the azimuth axis and this plane is referred to as the azimuth measuring plane. The output signal of the control transformer will correctly represent the azimuth of the aircraft as long as the spin axis of the directional gyro remains in the azimuth measuring plane. If the azimuth axis is fixed to the vertical axis of the aircraft, the azimuth measuring plane will not remain horizontal whenever the aircraft rolls or pitches. The spin axis of the gyro however, being fixed in inertial space, will remain horizontal and therefore will not stay in the azimuth measuring plane when the aircraft rolls or pitches. Accordingly the output signal of the control transformer will be incorrect when the aircraft rolls or pitches. Almost all the flight of an aircraft takes place at zero pitch so the error in a directional gyro output due to pitch of the aircraft is not a problem. However, whenever an aircraft makes a turn, it undergoes a substantial amount of roll and the incorrectness of the output signal from a directional gyro when the aircraft rolls is a problem. Preventing the error in the output signal from a directional gyro when the aircraft rolls is called roll stabilization.

In directional gyros of the prior art roll stabilization was provided by maintaining the azimuth axis of the system vertical and therefore the azimuth measuring plane horizontal. This was accomplished by means of a roll gimbal and servo mechanism operating in response to a source of roll information. The roll gimbal and servo mechanism adds considerable weight to the directional gyro and makes it occupy a considerably larger space. Furthermore, the servo components required to perform stabilization in this manner decrease the reliability of the system. In the system of the present invention, the azimuth axis is fixed to the vertical axis of the aircraft and the roll stabilization is provided by correcting the output signal obtained from the azimuth axis in accordance with the roll angle to provide the correct azimuth angle output. This stabilization means does not substantially increase the weight of the directional gyro or add to the space that it requires.

Accordingly the object of the present invention is to provide a directional gyro with an improved roll stabilization means.

Another object of the present invention is to provide a directional gyro in which roll stabilization is provided by correcting the output signal of the gyro azimuth axis transducer instead of maintaining the gyro azimuth axis aligned with vertical.

A further object of the present invention is to reduce the weight of the roll stabilization means in a directional gyro.

A still further object of the present invention is to reduce the space required for the roll stabilization means in a directional gyro system.

A still further object of the present invention is to increase the reliability of a directional gyro system with roll stabilization.

Further objects and advantages of the present invention will become readily apparent as the following detailed description of the invention unfolds and when taken in conjunction with the drawings wherein.

Figure 1:
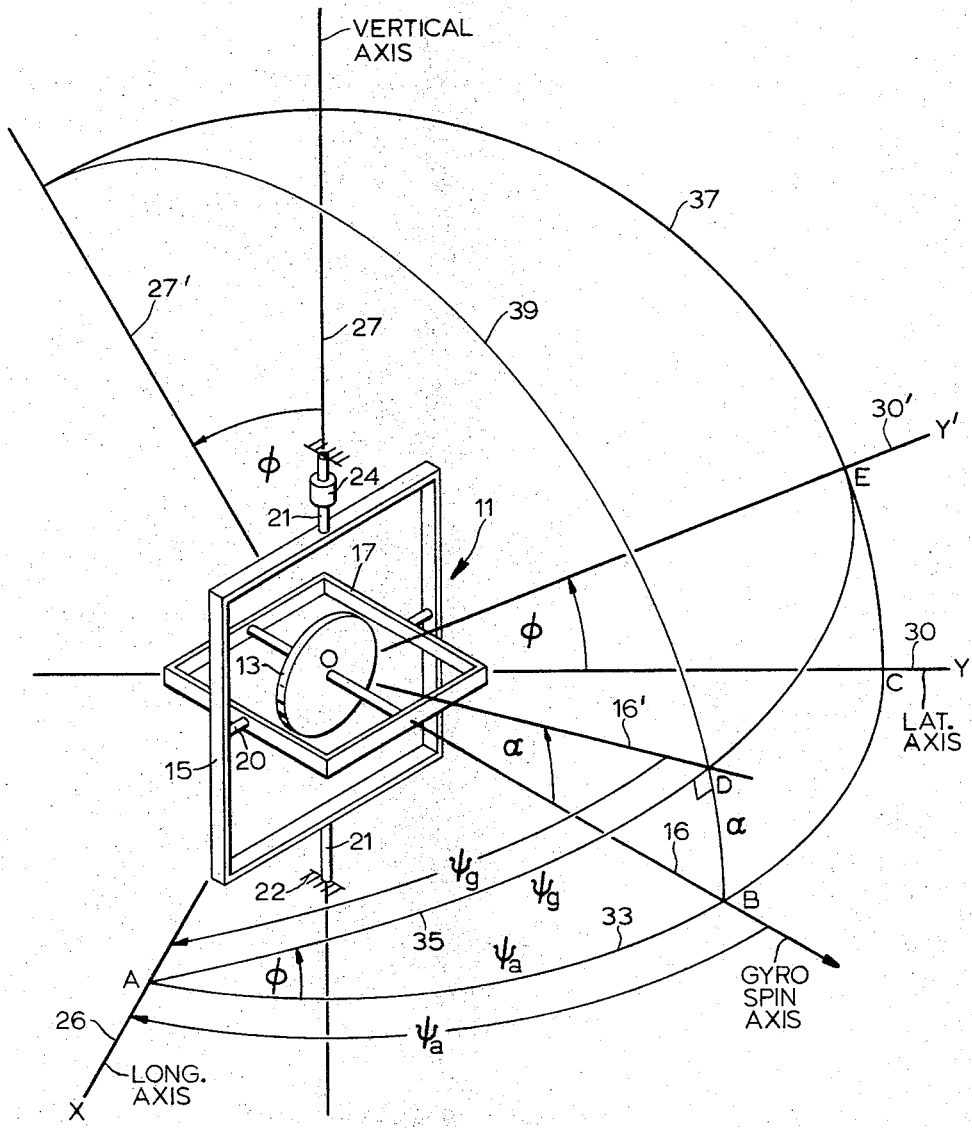
FIG. 1 is a diagram illustrating the relations between the axes of the aircraft and the axes of a directional gyro in which the azimuth axis of the system is fixed to the vertical axis of the aircraft.

As shown in FIG. 1 the directional gyro of the present invention comprises an inertial wheel 13 and gimbals 11 supporting the inertial wheel 13. The gimbals 11 permit the spin axis 16 of the gyro, which is the axis of the inertial wheel 13, to remain in a fixed orientation with respect to inertial space as the aircraft maneuvers. The inertial wheel is maintained in its fixed orientation either by its own inertia or by a gyro leveling circuit. The gimbals 11 comprise a gimbal frame 17, in which the inertial wheel 13 rotates, and a gimbal frame 15, in which the gimbal frame 17 is rotatably mounted on axles 20. The axles 20 are perpendicular to the spin axis 16. The gimbal frame 15 is rotatably mounted with respect to the aircraft frame 22 on normally vertical axles 21, which are perpendicular to the axles 20. The axis of the axles 21 is the azimuth axis of the directional gyro. The longitudinal axis of the aircraft is designated by the reference number 26. A transducer 24 is provided on the axles 21 to sense the position of the aircraft frame 22 with respect to the gimbal frame 15. Since the inertial wheel remains in a fixed orientation with respect to inertial space, the angular position of the gimbal frame 15 about the axis of the axles 21 with respect to inertial space will remain fixed. Thus the transducer 24 will sense the angular position of the longitudinal axis 26 about the azimuth axis. If the transducer 24 were a control transformer and the azimuth axis were maintained vertical, then the output signal of the transducer 24 would represent a true azimuth angle of the aircraft between the spin axis 16 and the longitudinal axis 26. The azimuth angle is designated by $\psi_a$ in FIG. 1. When the aircraft rolls causing its vertical axis to rotate about its longitudinal axis, the azimuth axis of the gyro will rotate with the vertical axis of the aircraft. The reference number 27 designates the position of the azimuth axis and the vertical axis of the aircraft when the aircraft has a zero roll and the reference number 27' designates the position of these axes when the aircraft has rolled through an angle $\phi$. The reference number 30 designates the position of the lateral axis of the aircraft when the aircraft has zero roll and the reference number 30' designates the position of the lateral axis when the aircraft has rolled through the angle $\phi$. When the aircraft rolls through the angle $\phi$, the spin axis 16 will remain horizontal. This is permitted by rotation of the gimbal frame 17 within the gimbal frame 15. When the aircraft has rolled through the angle $\phi$, the transducer 24 will sense the angle $\psi_g$ between the longitudinal axis 26 of the aircraft and the projection 16' of the spin axis 16 in the plane defined by the longitudinal axis 26 and the lateral axis position 30' which plane is the azimuth measuring plane when the aircraft has rolled through an angle $\phi$. Since the angle $\psi_g$ does not equal the angle $\psi_a$ the output signal from a control transformer being used for the transducer 24 would no longer correctly represent the azimuth angle $\psi_a$.

Directional gyros of the prior art which provided stabilization for aircraft roll to prevent such an incorrect reading of azimuth provided this stabilization by maintaining the axles 21 and therefore the azimuth axis of the directional gyro aligned with vertical by means of a gimbal servo system operating in response to roll information. The system of the present invention provides the stabilization for roll by providing a correction to the output signal from the transducer 24. To ascertain how the output signal from the transducer 24 should be corrected a great circle diagram is constructed in FIG. 1 on a sphere having its center at the intersection of the spin axis 16, and the vertical, longitudinal, and lateral axes of the aircraft. An arc 33 of one great circle is constructed in the horizontal plane of the spin axis from the longitudinal axis 26 to the position 30 of the lateral axis. This arc intersects the longitudinal axis 26 at a point A, intersects the spin axis 16 at a point B, and intersects the lateral axis 30 at a point C. An arc 35 of a second great circle is constructed in the plane of the longitudinal axis 26 and the position 30' of the lateral axis when the aircraft has rolled through the angle $\phi$. This arc 35 will intersect the longitudinal axis 26 at the point A, will intersect the projection of the spin axis 16' at a point D, and will intersect the lateral axis position 30' at a point E. The arc 37 of a third great circle is constructed in the plane of the vertical axis and the lateral axis of the aircraft. This arc 37 will intersect the lateral axis position 30 at the point C and the lateral axis position 30' at the point E. An arc 39 of a fourth great circle is constructed in the plane of the spin axis 16 and the position 27' of the vertical axis. This arc 39 will intersect the spin axis 16 at the point B and the projection of the spin axis 16' at the point D. This construction defines a right spherical triangle ABD, in which the 90° angle is the angle at point D. The angle of this triangle at point A will be the angle $\phi$. The angular length of the side AD of this triangle will be $\psi_g$ and the angular length of the side AB of this triangle will be $\psi_a$. The angular length of the side DB of this triangle will be the same as the angle between the spin axis 16 and the projection of the spin axis 16'. This angle is defined as $\alpha$. The following relations are obtained from consideration of the right spherical triangle ABD.

(1) $\quad \sin \psi_g = \tan \alpha \cot \phi$
(2) $\quad \cos \psi_a = \cos \alpha \cos \psi_g$
(3) $\quad \sin \alpha = \sin \phi \sin \psi_a$ From Equation 2 the following equation for $\cos \psi_g$ is obtained.

(4) $$\cos \psi_g = \frac{\cos \psi_a}{\cos \alpha}$$

When Equation 1 is divided by Equation 4 the following equation is obtained.

(5) $$\frac{\sin \psi_g}{\cos \psi_g} = \frac{\tan \alpha \cot \phi \cos \alpha}{\cos \psi_a} = \frac{\sin \alpha \cot \phi}{\cos \psi_a}$$

If Equation 3 is substituted into Equation 5 the following equation results.

(6) $$\frac{\sin \psi_g}{\cos \psi_g} = \frac{\sin \phi \sin \psi_a \cot \phi}{\cos \psi_a} = \frac{\sin \psi_a \cos \phi}{\cos \psi_a}$$

If both sides of Equation 6 are divided by $\cos \phi$ the following equation is obtained.

(7) $$\frac{\sin \psi_a}{\cos \psi_a} = \frac{\sin \psi_g}{\cos \psi_g \cos \phi}$$

Figure 2:
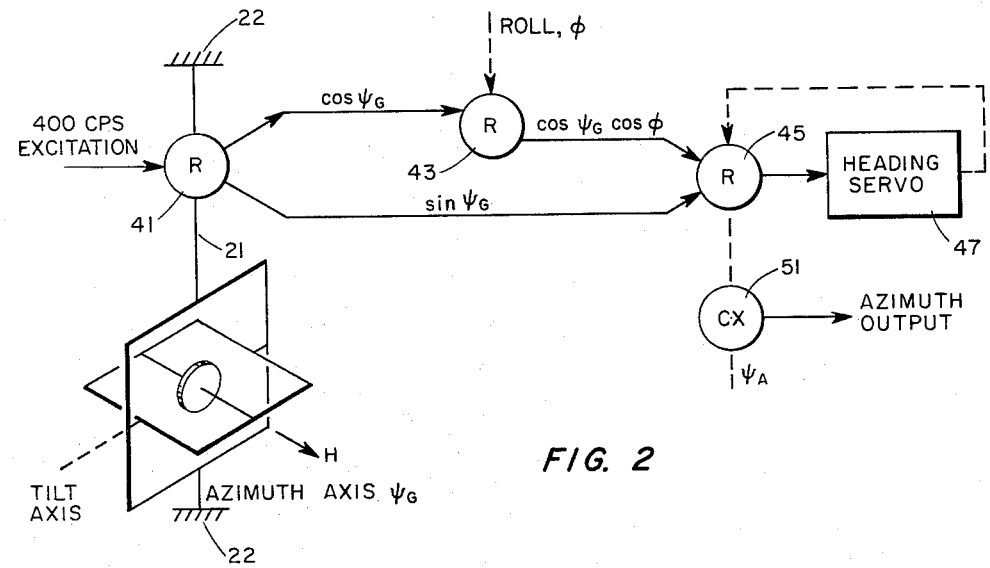
FIG. 2 is a block diagram schematically illustrating one embodiment of the system of the present invention.

By making use of Equation 7 the azimuth angle $\psi_a$ may be obtained from the angle $\psi_g$. FIG. 2 illustrates how this is carried out in the system of the present invention. The transducer 24 instead of being a control transformer providing a signal representing $\psi_g$ directly, is a resolver 41 which produces one output signal representing the sine of $\psi_g$ and another output signal representing the cosine of $\psi_g$. The signal representing the cosine of $\psi_g$ is fed to a resolver 43, the rotor of which is positioned at the roll angle $\phi$ so that the output of the resolver 43 represents the quantity $\cos \psi_g \cos \phi$. This output from the resolver 43 is applied to one input of the resolver 45, which also receives the output signal of the resolver 41 representing $\sin \psi_g$ applied to its other input. The output signal of the resolver 45 will represent the quantity $\cos \psi_g \cos \phi \sin \psi_x - \sin \psi_g \cos \psi_x$, in which $\psi_x$ is the angular position of the rotor of the resolver 45. The output signal of the resolver 45 is applied to a heading servo 47 which drives the rotor of the resolver 45 until the output signal of the resolver 45 is zero. When this occurs, the following equation will be true.

(8) $\quad \cos \psi_g \cos \phi \sin \psi_x - \sin \psi_g \cos \psi_x = 0$

From Equation 8 the following equation is derived.

(9) $\quad \cos \psi_g \cos \phi \sin \psi_x = \sin \psi_g \cos \psi_x$

If both sides of the Equation 9 are divided by $\cos \psi_g \cos \phi \cos \psi_x$ the following equation results.

(10) $$\frac{\sin \psi_x}{\cos \psi_x} = \frac{\sin \psi_g}{\cos \psi_g \cos \phi}$$

From Equation 7 it will be seen that when Equation 10 is true $\psi_x = \psi_a$. Thus the heading servo 47 drives the input shaft of the resolver 45 to the angle $\psi_a$. The heading servo 47 also drives the input shaft of a control transformer 51 to the angle $\psi_a$ so that the control transformer 51 produces an output signal representing the heading angle $\psi_a$. Thus the system produces an output signal representing the heading angle which remains correct when the aircraft rolls. This simplified roll stabilization is provided for the directional gyro without the use of a roll gimbal servo system with its added weight and size.

Figure 3:
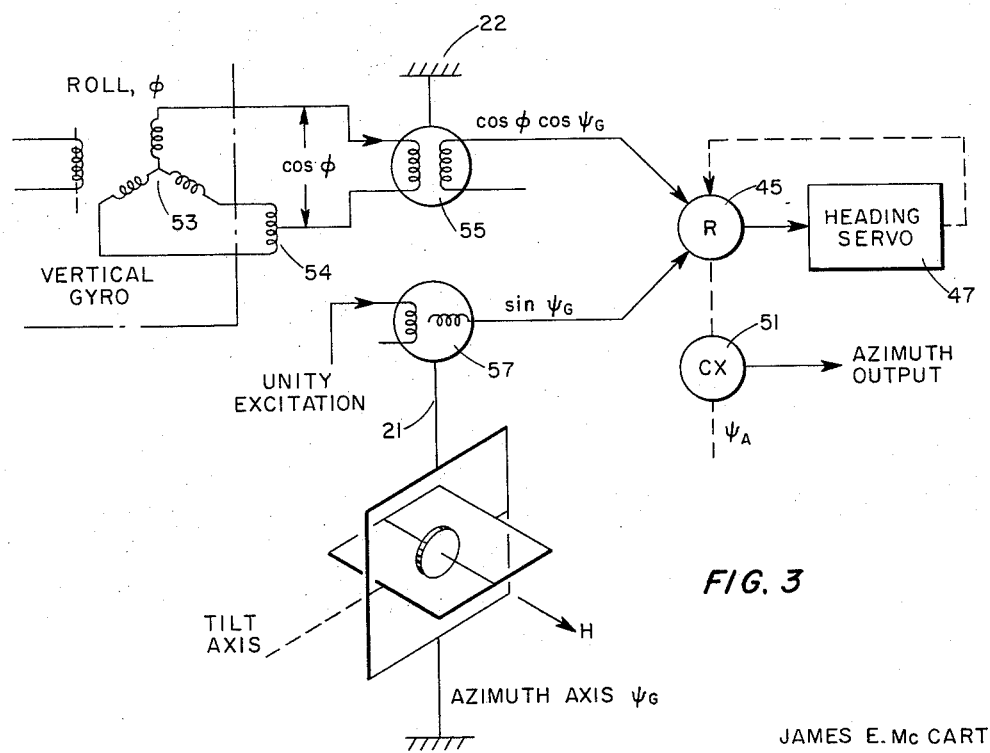
FIG. 3 is a schematic illustration of another embodiment of the system of the present invention.

When the roll angle $\phi$ is represented by the output from a three-wire transmitting synchro instead of being directly represented, the system shown in FIG. 3 can be used. In FIG. 3, the transmitting synchro providing the roll information is designated by the reference number 53. Two of the output wires from the transmitting synchro 53 are connected to opposite sides of a center tapped inductor 54. The center tap of the inductor 54 and the other wire from the transmitting synchro 53 are connected to opposite sides of an input winding of the resolver 55, the input shaft of which is mounted to sense the rotation of the aircraft frame 22 on the axle 21 of the directional gyro. The signal applied across the input winding of the resolver 55 will represent the cosine of the roll angle $\phi$. The resolver 55 produces an output representing the quantity $\cos \phi \cos \psi_g$. A second resolver 57 has its input shaft mounted to sense the rotation of the aircraft frame 22 on the axle 21. This resolver is provided with unity excitation and produces an output signal representing $\sin \psi_g$. The output signal representing the quantity $\cos \phi \cos \psi_g$ is then applied to one input of the resolver 45 and the output signal representing $\sin \psi_g$ is applied to the other input of the resolver 45. The heading servo 47 in response to the output signal of the resolver 45 then drives the input shaft of the resolver 45 to the angle $\psi_a$ and the control transformer 51 produces an output signal representing the azimuth angle $\psi_a$ in the same manner that these components operate in the system of FIG. 1.

Thus the invention provides simplified roll stabilization for a directional gyro of much less weight and taking up much less space than the roll stabilization used by directional gyros in the prior art. Many modifications may be made to the above described specific embodiments of the invention without departing from the spirit and scope of the invention, which is defined in the appended claims.

What is claimed is:

1. In combination with a directional gyroscope having a first gimbal frame adapted to be mounted on a vehicle for angular displacement about a first axis fixed with respect to the vehicle and constituting the azimuth axis of the gyroscope, a second gimbal frame mounted on said first gimbal frame for angular displacement relative thereto about a second gyroscope axis normal to said first axis, and a momentum wheel mounted by said gimbal frames for rotation about a third gyroscope axis perpendicular to the plane defined by said first and second axes, a system for deriving, from angular displacement of said first gimbal from a reference point about said first axis, a signal representative of the degree of said displacement in a horizontal plane, said system including means for compensating for angular displacement of said first axis from vertical about a roll axis perpendicular to said first axis, said system comprising:

means, including a resolver connected to said first gimbal to detect angular displacement thereof, to generate a first electrical signal proportional to the product of the cosine of the angle of displacement of said first axis about said roll axis and the cosine of the angle of displacement of said first gimbal frame from said reference point about said first axis and a second electrical signal proportional to the sine of said angle of displacement of said first gimbal frame; and means, including an additional resolver having a rotor and two input windings, said input windings receiving said first and second signals, respectively, to generate a signal representing the degree of angular displacement of said first gimbal frame about a vertical axis.

2. The combination defined in claim 1 wherein said last-named means includes a servo connected to receive the output signal of said additional resolver and drive the rotor thereof to a point where said output signal is substantially zero.

3. In combinaion with a directional gyroscope having a first gimbal frame adapted to be mounted on a vehicle for angular displacement about a first axis fixed with respect to the vehicle and constituting the azimuth axis of the gyroscope, a second gimbal frame mounted on said first gimbal frame for angular displacement relative thereto about a second gyroscope axis normal to said first axis, and a momentum wheel mounted by said gimbal frames for rotation about a third gyroscope axis perpendicular to the plane defined by said first and second axes, a system for deriving, from angular displacement of said first gimbal from a reference point about said first axis, a signal representative of the degree of said displacement in a horizontal plane, said system including means for compensating for angular displacement of said first axis from vertical about a roll axis perpendicular to said first axis, said system comprising:

a sine-cosine resolver having a rotor connected to said first gimbal and windings to generate respective signals proportional to the sine and cosine of the angle of displacement of said first gimbal about said first axis;

a second resolver having a rotor and windings, the rotor being connected to detect angular displacement of said first gimbal axis about said roll axis and the windings receiving said cosine signal from the first-mentioned resolver and being arranged to generate an output proportional to the product of said cosine signal and the cosine of the angle of displacement of said first gimbal axis about said roll axis;

a third resolver having a pair of inputs and a rotor, said inputs being connected, respectively, to receive the sine signal of said first resolver and the product signal of said second resolver; and a servo connected to receive the output signal of said third resolver and drive the rotor thereof to a point where said output signal is substantially zero.

4. The combination defined in claim 3 including means responsive to the rotational position of the rotor of said third resolver to generate a signal representing the azimuth angle.

5. In combination with a directional gyroscope having a first gimbal frame adapted to be mounted on a vehicle for angular displacement about a first axis fixed with respect to the vehicle and constituting the azimuth axis of the gyroscope, a second gimbal frame mounted on said first gimbal frame for angular displacement relative thereto about a second gyroscope axis normal to said first axis, and a momentum wheel mounted by said gimbal frames for rotation about a third gyroscope axis perpendicular to the plane defined by said first and second axes, a system for deriving, from angular displacement of said first gimbal from a reference point about said first axis, a signal representative of the degree of said displacement in a horizontal plane, said system including means for compensating for angular displacement of said first axis from vertical about a roll axis perpendicular to said first axis, said system comprising:

a pair of resolvers having respective rotors, input and output windings, the rotors being connected to detect angular displacement of said first gimbal frame about said first axis;

means to generate and apply to the input winding of one of said resolvers, an electrical signal proportional to the cosine of the angle of displacement of said first axis about said roll axis, the windings of said one resolver being arranged to generate an output signal proportional to the product of the input signal and the angle of displacement of said first gimbal frame about said first axis;

means to apply unity excitation to the input winding of the other of said resolvers, the windings of said other resolver being arranged to generate an output signal proportional to the sine of the angle of displacement of said first gimbal about said first axis;

a third resolver having a pair of inputs and a rotor, said inputs benig connected, respectively, to receive the output signals of said one resolver and said other resolver; and a servo connected to receive the output signal of said third resolver and drive the rotor thereof to a point where said output signal is substantially zero.

6. The combination defined in claim 5 including means responsive to the rotational position of the rotor of said third resolver to generate a signal representing the azimuth angle.

References Cited by the Examiner
UNITED STATES PATENTS 2,597,125  5/1952  Noxon _____ 33—224
3,131,292  4/1964  Tobin _____ 33—204 X BROUGHTON G. DURHAM, *Primary Examiner.*

P. W. SULLIVAN, *Assistant Examiner.*